United States Patent
Silverman et al.

(10) Patent No.: US 7,483,017 B2
(45) Date of Patent: Jan. 27, 2009

(54) INK COLLECTION AND RENDERING

(75) Inventors: Andrew Silverman, Seattle, WA (US); Sam J. George, Duvall, WA (US); Shiraz Somji, Kenmore, WA (US); Rudolph Balaz, Redmond, WA (US); Koji Kato, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 953 days.

(21) Appl. No.: 10/644,896

(22) Filed: Aug. 21, 2003

(65) Prior Publication Data

US 2005/0052433 A1   Mar. 10, 2005

(51) Int. Cl.
 *G09G 5/00* (2006.01)
(52) U.S. Cl. ..................... 345/179; 345/156
(58) Field of Classification Search .............. 178/20.02; 345/501–506, 522, 156–179, 766, 764, 629, 345/630; 709/300–305; 715/514, 765
See application file for complete search history.

(56) References Cited

U.S. PATENT DOCUMENTS

| | | | |
|---|---|---|---|
| 4,633,436 A | 12/1986 | Flurry | |
| 5,347,620 A | 9/1994 | Zimmer | |
| 5,534,893 A | 7/1996 | Hansen, Jr. et al. | |
| 5,892,399 A * | 4/1999 | Milam | 330/264 |
| 6,111,565 A | 8/2000 | Chery et al. | |
| 6,326,957 B1 | 12/2001 | Nathan et al. | |
| 6,651,221 B1 | 11/2003 | Thompson et al. | |
| 6,667,739 B2 | 12/2003 | Atwood et al. | |
| 6,681,045 B1 | 1/2004 | Lapstun et al. | |
| 6,707,473 B2 | 3/2004 | Dresevic et al. | |
| 6,724,372 B1 | 4/2004 | Bi et al. | |
| 6,909,430 B2 | 6/2005 | Dresevic et al. | |
| 7,096,199 B2 | 8/2006 | Lapstun et al. | |
| 7,190,346 B2 | 3/2007 | Lapstun et al. | |
| 7,190,375 B2 | 3/2007 | Dresevic et al. | |
| 7,190,491 B2 | 3/2007 | Silverbrook et al. | |
| 2002/0157880 A1* | 10/2002 | Atwood et al. | 178/20.02 |
| 2005/0093836 A1 | 5/2005 | Dodge et al. | |
| 2007/0176904 A1 | 8/2007 | Russo | |

OTHER PUBLICATIONS

Walid G. Aref et al., "On Handling Electronic Ink", ACM Computing Surveys, vol. 27, No. 4, Dec. 1995.
Walid Aref et al., "The Handwritten Trie: Indexing Electronic Ink", Matsushita Information Technology Laboratory, pp. 151-162, ACM 0-8971-731-6/95.
Patrick Chiu et al., "A Dynamic Grouping Technique for Ink and Audio Notes", ACM, pp. 195-202, 1998.
David Bargeron et al., "Reflowing Digital Ink Annotations", vol. 5, Issue No. 1, pp. 385-392, Apr. 5-10, 2003.
Gene Golovchinsky et al., "Moving Markup: Repositioning Freeform Annotations", UIST'02, vol. 4, Issue 2, pp. 21-29, Oct. 27-30, 2002.

(Continued)

*Primary Examiner*—Nitin Patel
(74) *Attorney, Agent, or Firm*—Lee & Hayes, PLLC (57) ABSTRACT

A system and process for capturing and rendering ink is described. An ink canvas object may contain none, one, or more objects or elements and may specify the z-order of the objects or elements. The ink canvas object may host a variety of objects or elements and, therefore, provide ink functionality to the objects or elements, even though they themselves may not have ink functionality.

20 Claims, 9 Drawing Sheets

OTHER PUBLICATIONS

Andrè Meyer, "Pen Computing", SIGCHI Bulletin, vol. 27, No. 3, Jul. 1995.

Bill N. Schilit et al., "Beyond Paper: Supporting Active Reading with Free Form Digital Ink Annotations", pp. 249-256, CHI 98, Apr. 18-23, 1998.

Lynn D. Wilcox et al., "Dynomite: A Dynamically Organized Ink and Audio Notebook", pp. 186-193, CHI 97, Mar. 22-27, 1997.

Marcel Götze et al., "The Intelligent Pen-Toward a Uniform Treatment of Electronic Documents", Int. Symp. On Smart Graphics, pp. 129-135, Jun. 11-13, 2002.

Jason I. Hong et al., "SATIN: A Toolkit for Informal Ink-based Applications", UIST '00, CHI Letters vol. 2, pp. 63-72, 2000.

S.C. Hsu et al., "Skeletal Strokes", UIST'93, pp. 197-206, Nov. 3-5, 1993.

Thomas P. Moran et al., "Pen-Based Interaction Techniques For Organizing Material on an Electronic Whiteboard", UIST '97, pp. 45-54, 1997.

Lisa Stifelman et al., "The Audio Notebook" Paper and Pen Interaction with Structured Speech, CHI 2001, pp. 182-189, vol. No. 3, Issue No. 1, Mar. 31-Apr. 5, 2001.

Steve Strassmann, "Hairy Brushes", ACM, vol. 20, No. 4, pp. 225-232, Aug. 18-22, 1986.

Zouheir Trabelsi et al., "A Voice and Ink XML Multimodal Architecture for Mobile e-Commerce Systems", ACM, pp. 100-104, 2002.

Search Report of May 18, 2004.

Cohen, et al. "Harold: A World Made of Drawings", ACM, 2002, pp. 83-90.

Saund, et al, "Stylus Input and Editing without Prior Selection of Mode", ACM, vol. 5, Issue 2, 2003, pp. 213-216.

Official Notice of Rejection for Chinese Patent Application No. 03801758.X Mailed on Jan. 3, 2008, pp. 17.

Golovchinsky, et al, "Moving Markup: Repositioning Freeform Annotations", ACM, vol. 4, Issue 2, (2002) pp. 21-24.

Saund, et al, "Perceptually-Supported Image Editing of Text and Graphics", ACM, vol. 5, Issue 2, (2003) pp. 183-192.

* cited by examiner

INK COLLECTION AND RENDERING

BACKGROUND OF THE INVENTION

1. Field of the Invention

Aspects of the present invention relate to information capturing and rendering. More specifically, aspects of the present invention relate to capturing and rendering electronic ink.

2. Description of Related Art

People often rely on graphical representations more than textual representations of information. They would rather look at a picture than a block of text that may be equivalent to the picture. For instance, a home owner may cut out pictures from magazines to show contractors exactly what is desired when remodeling a kitchen or bathroom. Textual descriptions of the same material often fall short. The tool that the home owner may use is no more complex than a pair of scissors.

In the computing world, however, attempting to capture and convey the identical content is cumbersome. Typical computer systems do not provide an easy interface for capturing and conveying graphically intensive content. Rather, they are optimized for capturing and rendering text. For instance, typical computer systems, especially computer systems using graphical user interface (GUI) systems, such as Microsoft WINDOWS, are optimized for accepting user input from one or more discrete input devices such as a keyboard for entering text, and a pointing device such as a mouse with one or more buttons for driving the user interface.

Some computing systems have expanded the input and interaction systems available to a user by allowing the use of a stylus to input information into the systems. The stylus may take the place of both the keyboard (for data entry) as well as the mouse (for control). Some computing systems receive handwritten electronic information or electronic ink and immediately attempt to convert the electronic ink into text. Other systems permit the electronic ink to remain in the handwritten form.

Despite the existence of a stylus, various approaches to combining electronic ink with a typical graphical user interface may be cumbersome for developers of third party applications. Accordingly, there is a need in the art for an improved system for capturing and rendering ink that is friendly for third party developers.

BRIEF SUMMARY

Aspects of the present invention address one or more of the issues mentioned above, thereby providing better content capture and rendering for use by third party developers. In some embodiments, the ink capturing and rendering element may be manifest as an object that is part of a structure in which each element in an interface may be specified in depth (or z-order). In some cases, the object may render the various elements in the interface in their specified z-order and then render ink on the top-most layer. In other cases, the ink and other elements may be intermingled.

These and other aspects are addressed in relation to the Figures and related description.

BRIEF DESCRIPTION OF THE DRAWINGS

The present invention is illustrated by way of example and not limited in the accompanying figures in which like reference numerals indicate similar elements and in which.

DETAILED DESCRIPTION OF THE DRAWINGS

Aspects of the present invention relate to an improved ink capturing and rendering system.

This document is divided into sections to assist the reader. These sections include: characteristics of ink; terms; general-purpose computing environment; ordering of objects; constructors, properties, methods, and events of objects; relationships; and clipping.

Characteristics of Ink

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence of strokes, where each stroke is comprised of a sequence of points. The points may be represented using a variety of known techniques including Cartesian coordinates (X, Y), polar coordinates (r, T), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink), among other information.

Terms

Ink—A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level.

Ink object—A data structure storing ink with or without properties.

Stroke—A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point—Information defining a location in space. For example, the points may be defined relative to a capturing space (for example, points on a digitizer), a virtual ink space (the coordinates in a space into which captured ink is placed), and/or display space (the points or pixels of a display device).

Elements—Objects that are placed in a tree, with their placement in the tree serving as an order.

General-Purpose Computing Environment

Figure 1:
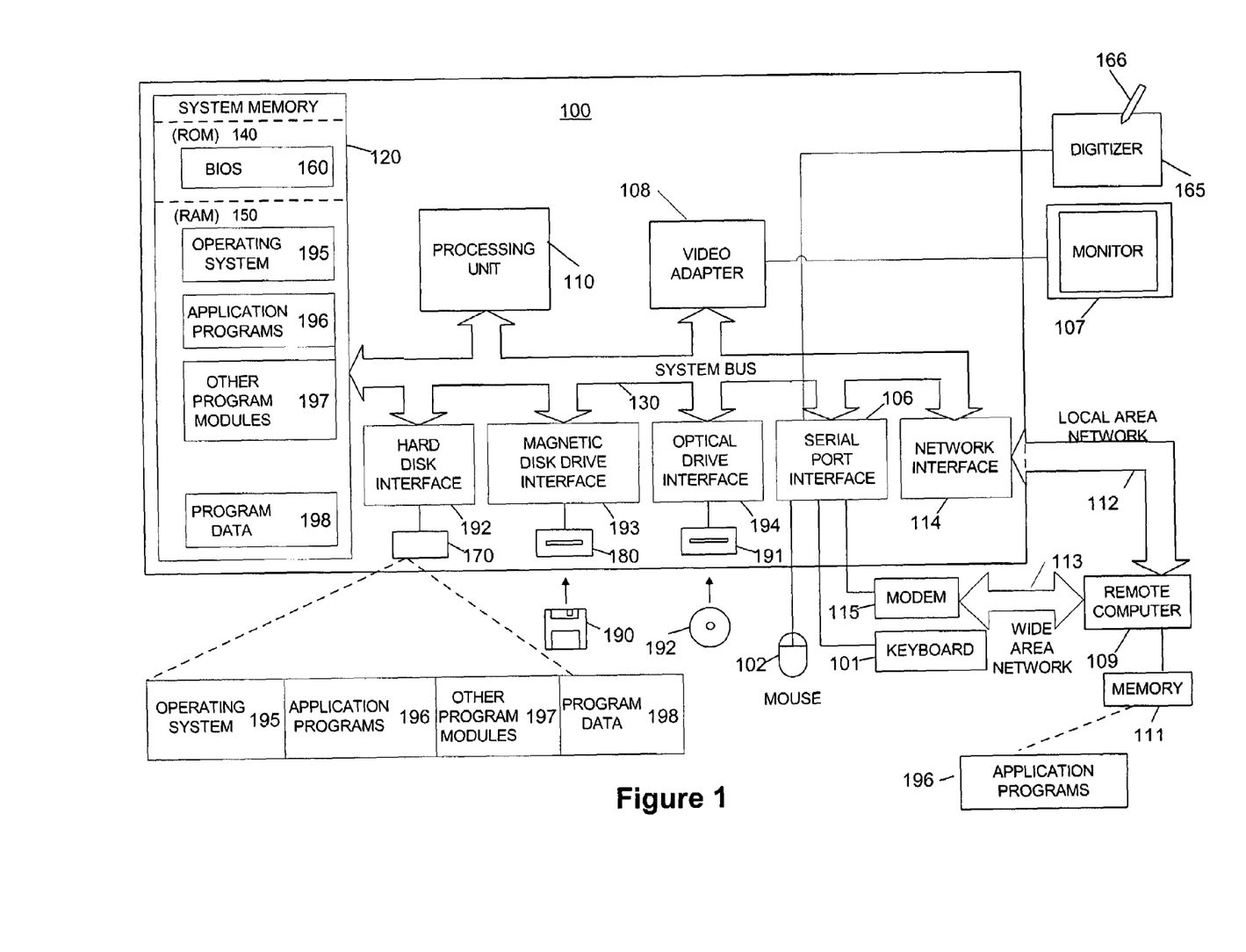
FIG. 1 shows a general-purpose computer supporting one or more aspects of the present invention.

FIG. 1 illustrates a schematic diagram of an illustrative conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In one embodiment, a pen digitizer 165 and accompanying pen or stylus 166 are provided in order to digitally capture freehand input. Although a direct connection between the pen digitizer 165 and the serial port interface 106 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device. Further, the system may include wired and/or wireless capabilities. For example, network interface 114 may include Bluetooth, SWLan, and/or IEEE 802.11 class of combination abilities. It is appreciated that other wireless communication protocols may be used in conjunction with these protocols or in place of these protocols.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server.

Any of various conventional web browsers can be used to display and manipulate data on web pages.

Figure 2:
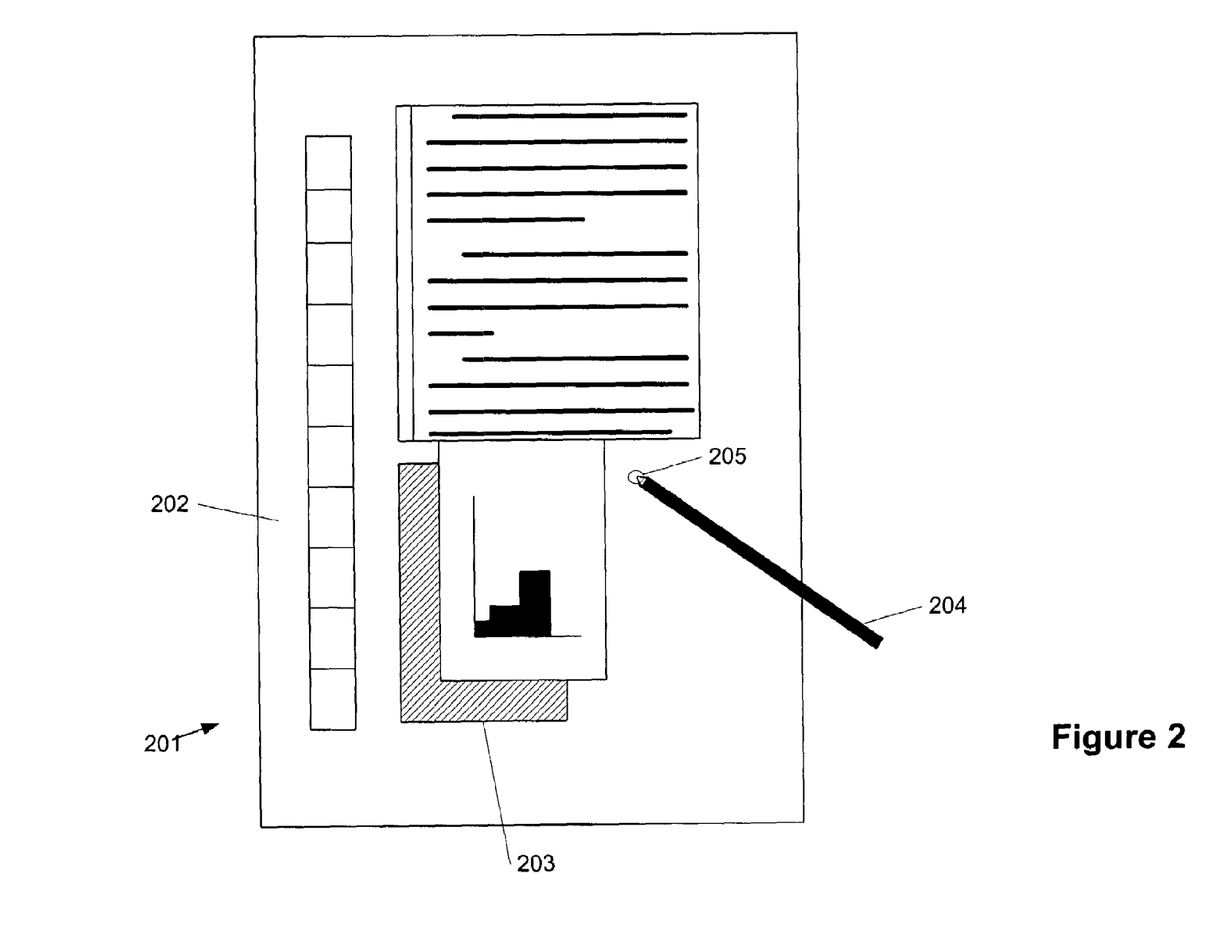
FIG. 2 shows a display for a stylus-based input system according to aspects of the present invention.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers.

Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Ordering of Objects

Figure 3A:
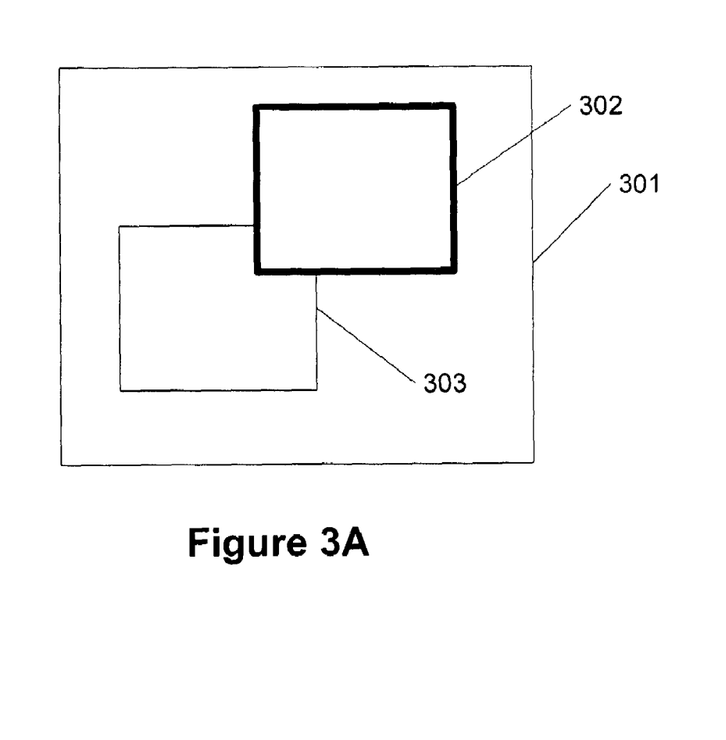
FIGS. 3A and 3B show various examples of interfaces and how ordering is controlled in each in accordance with aspects of the invention.
Figure 3B:
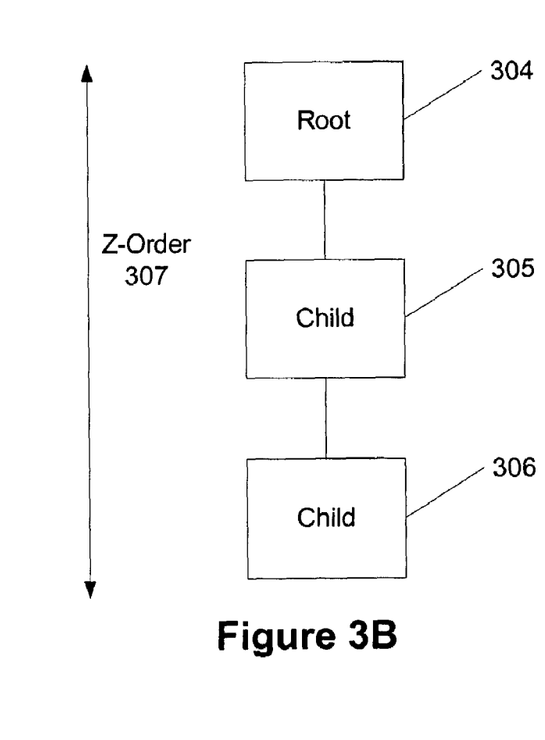

FIGS. 3A and 3B show various techniques of ordering items in an interface. In FIG. 3A, a window 301 includes items 302 and 303. Here, item 302 has focus so it is present in front of item 303. In FIG. 3B, content is arranged in a tree. Here, a root node (referred to as "root") 304 is the node from which all other nodes in the tree are based. Child nodes 305 and 306 are placed in the tree from root node 304. Their relative positions to each other define how they will be rendered, above or below each other. The axis 307 at the left side of FIG. 3B illustrates the "z-order" of the various nodes in this example tree.

Figure 4:
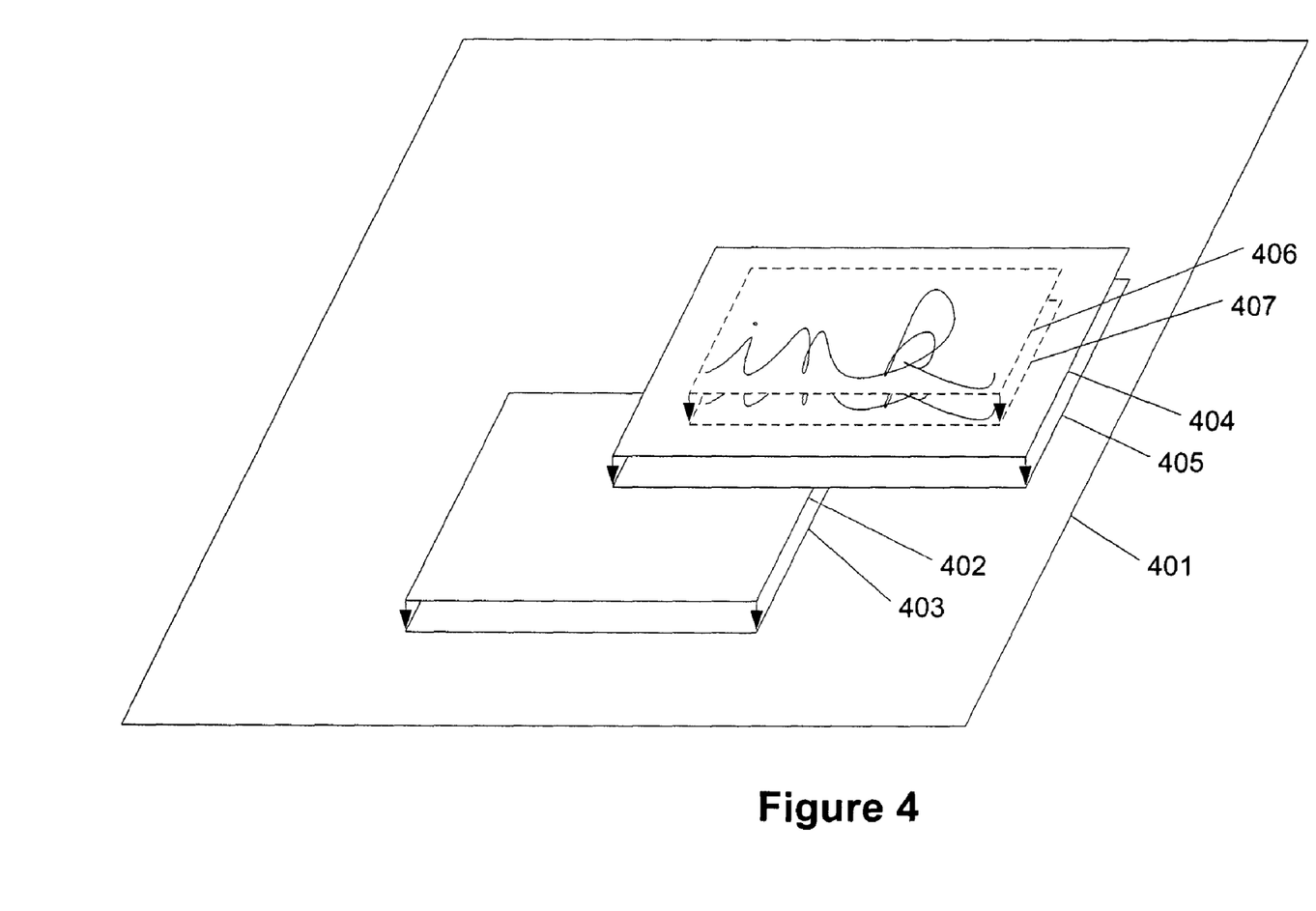
FIG. 4 shows ink applied to a region in accordance with aspects of the present invention.

FIG. 4 shows an example of how ink may be rendered in a system having a z-ordered (or depth ordered) ordering structure. Here, window 401 is shown with content. The content includes content 402 that is rendered at position 403 and content 404 that is rendered at position 405. Once the previous contents 402 and 404 have been rendered, ink 406 may be rendered at position 407 on the top most content (here 404). Ink 406 may or may not always be associated with the top most content 404. For instance, a user may be working with a form 404 that accepts ink information as content 406. Here, the form 404 may be rendered prior to having ink 406 placed upon it.

In an alternative approach, the ink may lie underneath other elements. For instance, ink may be rendered and then elements rendered on top. The rendering of ink may be intermixed with the rendering of the elements.

Constructors, Properties, Methods, and Events of Objects

Figure 5:
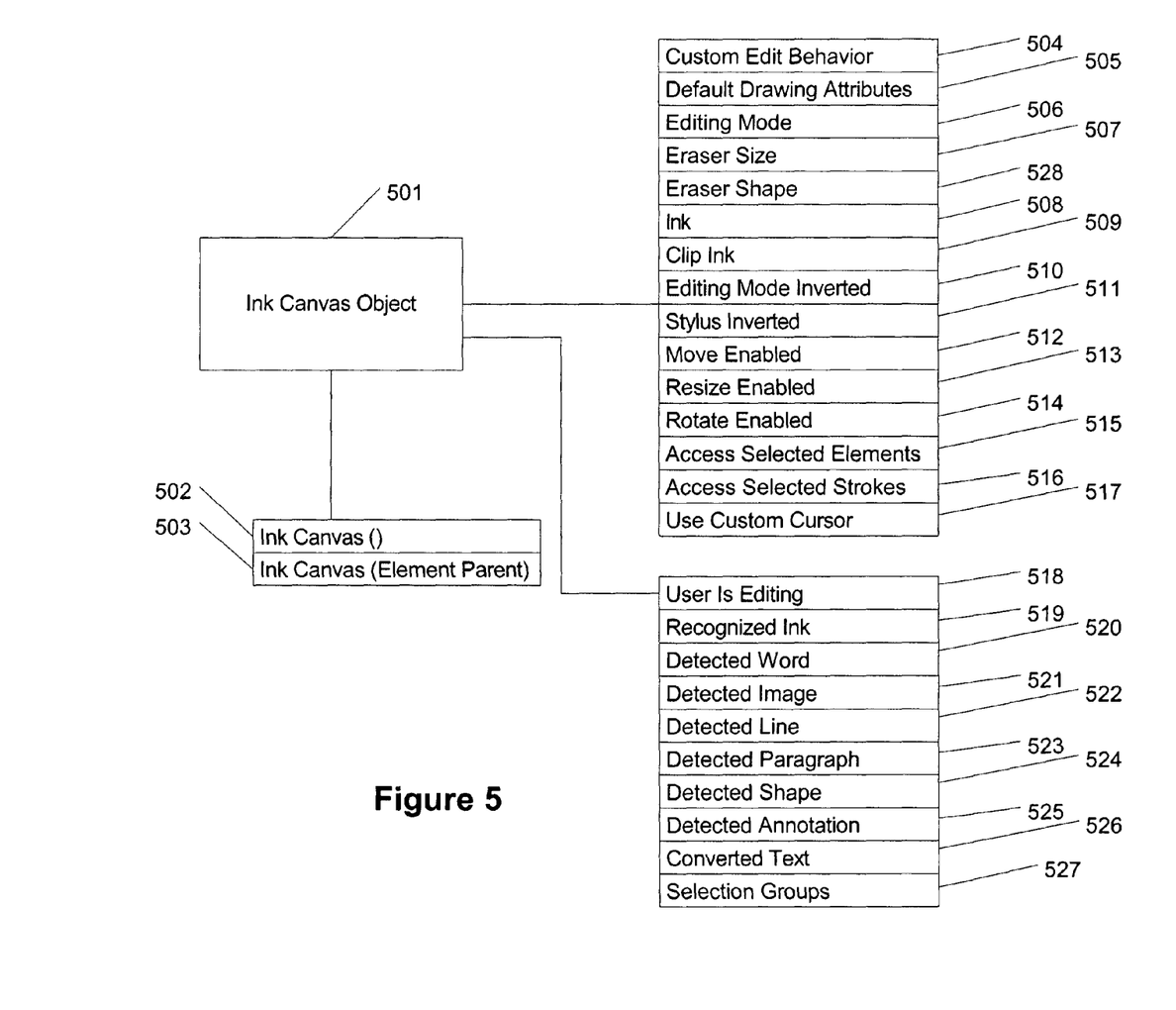
FIG. 5 shows constructors and properties of an object in accordance with aspects of the present invention.
Figure 6:
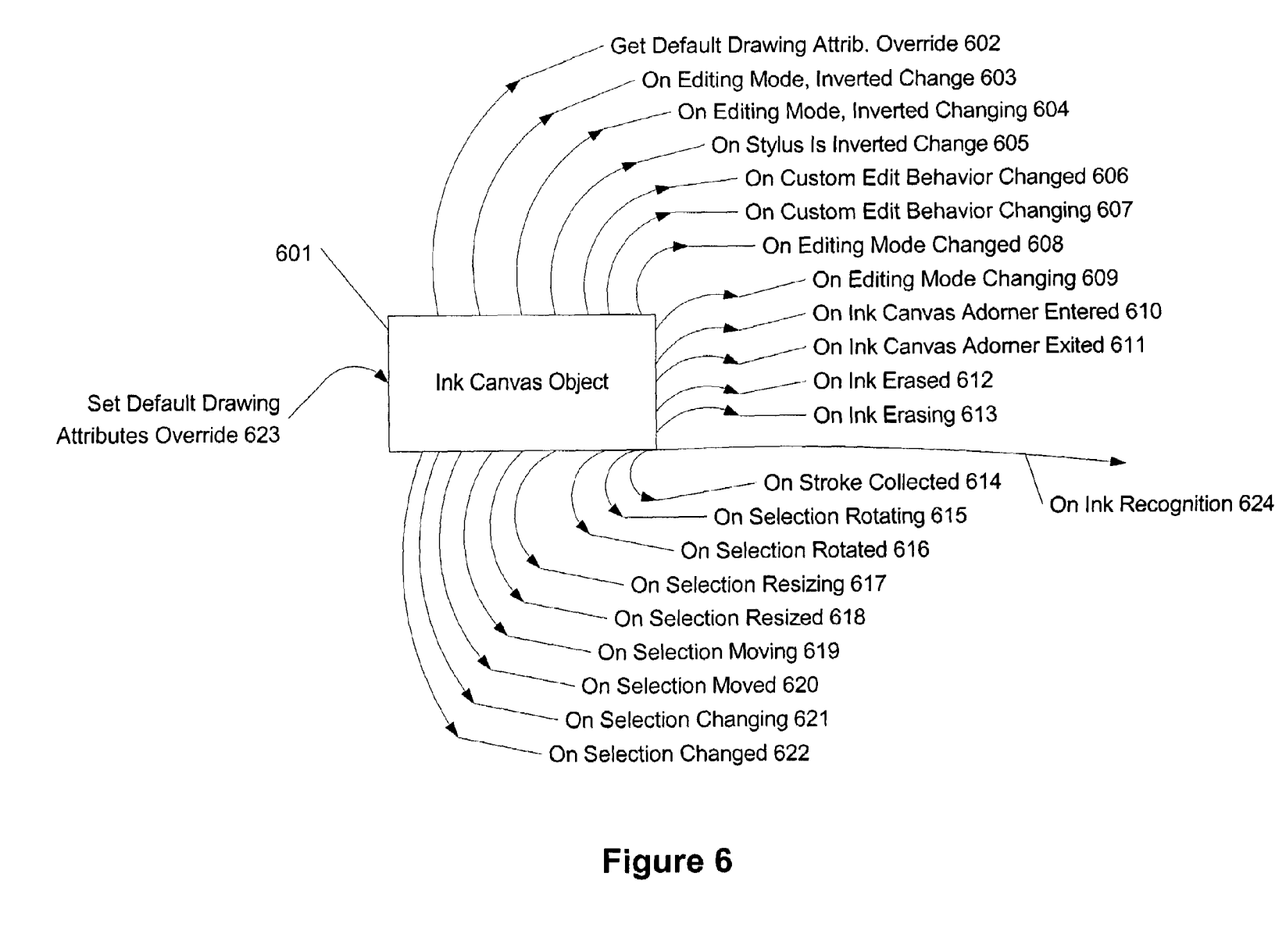
FIG. 6 shows methods of an object in accordance with aspects of the present invention.
Figure 7:
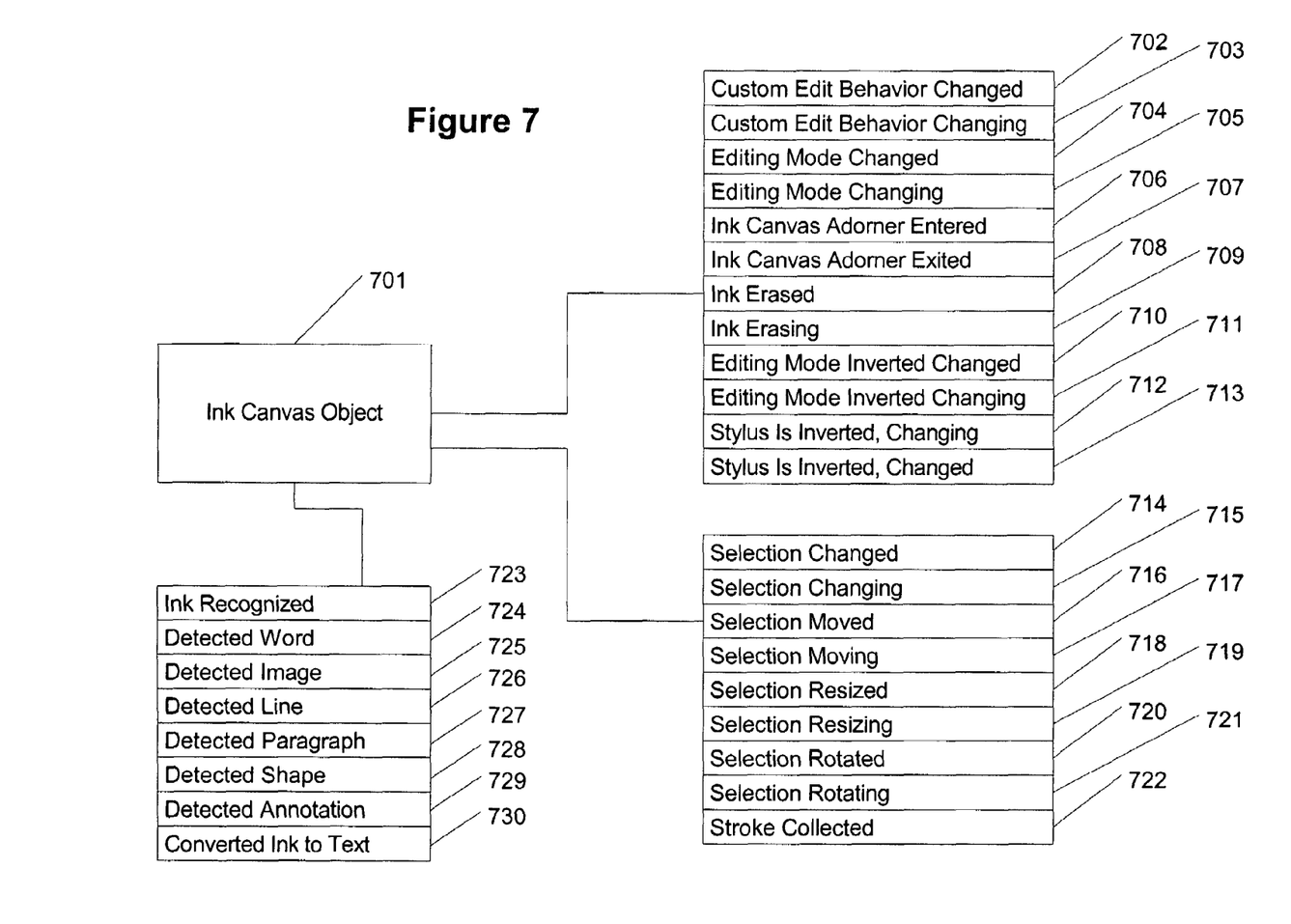
FIG. 7 shows events of an object in accordance with aspects of the present invention.

To control the layering order of content, an object may be used to handle this task. For simplicity, this disclosure refers to an object that may handle this task related to ink as an "ink canvas" object (in that it is functionally similar to how a painter applies paint in layers to a physical canvas). In one example, the ink canvas may be an element. In another example, the ink canvas may be an object (where all elements are objects, but not all objects are elements). For simplicity, the ink canvas is referred to herein as an object. The ink canvas object is shown in FIGS. 5-7 with various constructors, properties, methods and events. It is appreciated that the various constructors, properties, methods and events are shown for illustrative purposes only. Some, all, or additional ones may be present in various forms in other examples of an ink canvas object without departing from this invention. The ink canvas object may host zero or more elements or objects. The ink canvas object may render ink for hosted elements or objects or those elements or objects may render ink for themselves.

The following Figures and description thereof illustrate various examples of methods, properties, events and constructors. It is appreciated that, in some instances, various items may be hidden from outside access, yet accessible by a different mechanism. For instance, a method may be used to return an ink object, selected ink strokes, an ink stream, or an array of bytes. This method may be used in place of accessing a property that may contain this information. Methods may be used to access or set properties, respond to or throw events, and the like. Properties may describe the states of methods and/or events. Events may indicate when properties are set or when methods have been executed. Other examples follow from these but are not listed here.

Various aspects may or may not be present in an ink canvas object. First, an ink canvas object may host elements and/or objects. The elements and objects may be rendered by the ink canvas object or may render themselves. The ink canvas object may be hosted in a tree-based organizational structure. The ink canvas object may be created in a markup language (for instance, HTML, XML, and/or XAML, and the like). The ink canvas object may include recognition functionality (including handwriting recognition, shape recognition, drawing recognition, annotation recognition and the like). The ink canvas object may include extensible editing functionality. Finally, the ink canvas object may include a variety of application programming interfaces that permit a developer to write applications that interact with the ink canvas object. One or more of these aspects may be present in an ink canvas object.

FIG. 5 shows constructors and properties associated with the ink canvas object. The ink canvas object is shown as 501. Two constructors are shown as 502 and 503. Constructor 502 is a public constructor with default collection and rendering capabilities enabled. Constructor 503 creates a new instance of the ink canvas object 501 with a link to a specified parent.

FIG. 5 also shows properties 504-518:

Custom Edit Behavior property 504 allows one to set a custom edit behavior.

Default Drawing Attributes property 505 defines drawing attributes for newly collected strokes.

Editing Mode property 506 sets the current editing mode.

Eraser Size property 507 sets the size of the eraser when an erasing mode has been enabled.

Erase Shape property 528 sets the shape (round, oval, square, rectangular, and the like) of the eraser when an erasing mode has been enabled.

The Ink property 508 allows access to the ink contained in the ink canvas object.

Clip Ink property 509 determines when ink will be clipped to the size of the ink canvas' displayed region.

Editing Mode Inverted property 510 indicates which editing mode (or other language or state) will be active when a user's pen is inverted. It is noted that additional pens may be used. Accordingly, additional properties 510 may be used to define other modes to be associated with other pen tips.

Stylus Inverted property 511 indicates whether the stylus is currently inverted.

Move Enabled property 512 enables and disables an ability to move created ink.

Resize Enabled property 513 enables and disables an ability to resize created ink.

Rotate Enabled property 514 enables and disables an ability to rotate created ink.

Access Selected Elements property 515 enables access to currently selected elements that are children of a current ink canvas 501.

Access Selected Strokes property 516 enables access to currently selected strokes that are associated with the current ink canvas 501.

Use Custom Cursor property 517 indicates that a developer is using a custom mouse cursor and that the current cursor is to be maintained.

User Is Editing property 518 indicates that the ink canvas 501 is currently collecting ink.

Selection Groups property 527 indicates which strokes or ink objects are grouped together for group or parser-aware selections and operations.

In addition to the above properties, the ink canvas object 501 may or may not further include one or more ink recognition properties.

Recognized Ink property 519 indicates that ink has been recognized. The recognition may or may not be associated with a currently selected or previously selected stroke or strokes.

Detected Word property 520 indicates which set of strokes or ink object has been detected as a word.

Detected Image property 521 indicates which set of strokes or ink object has been detected as an image.

Detected Line property 522 indicates which set of strokes or ink object has been detected as a line.

Detected Paragraph property 523 indicates which set of strokes or ink object has been detected as a paragraph.

Detected Shape property 524 indicates which set of strokes or ink object has been detected as shape (and/or the type of shape).

Detected Annotation property 525 indicates which set of strokes or ink object or objects have been detected as an annotation.

Converted Text property 526 includes text recognized from ink. Alternatively, it may indicate that, for a rendering of one or more ink strokes or objects, converted text is to be used in place of a visible form of the ink.

It is appreciated that the above properties are listed for illustrative purposes only. Other properties may be used in addition to or in place of the above properties with the ink canvas object.

FIG. 6 shows various methods associated with an ink canvas object 601:

Get Default Drawing Attributes Override method 602 gets the default override settings for a specific stylus. For instance, a user may have one stylus for editing and one for erasing. This method allows one to control the default behavior for a specific stylus.

On Editing Mode, Inverted Change method 603 throws an event that the inverted mode has changed.

On Editing Mode, Inverted Changing method 604 throws an event that the inverted mode is changing.

On Stylus Is Inverted Change method 605 throws an event when a stylus is used to change the inverted editing mode.

On Custom Edit Behavior Changed method 606 throws an event indicating that a custom edit behavior has changed.

On Custom Edit Behavior Changing method 607 throws an event indicating that a custom edit behavior is changing.

On Editing Mode Changed method 608 throws an event indicating that the editing mode has changed.

On Editing Mode Changing method 609 throws an event indicating that the editing mode is changing.

On Ink Canvas Adorner Entered method 610 throws an event when a graphic adorner (a graphical placeholder that may or may not be shown when a user selects ink) for ink is entered.

On Ink Canvas Adorner Exited method 611 throws an event when a graphic adorner for ink is exited.

On Ink Erased method 612 throws an event when ink is erased.

On Ink Erasing method 613 throws an event when ink is in the process of being erased.

On Stroke Collected method 614 throws an event when strokes are collected.

On Selection Rotating method 615 throws an event when a selection is in the process of being rotated.

On Selection Rotated method 616 throws an event when a selection has been rotated.

On Selection Resizing method 617 throws an event when a selection is in the process of being resized.

On Selection Resized method 618 throws an event when a selection has been resized.

On Selection Moving method 619 throws an event when a selection is in the process of being moved.

On Selection Moved method 620 throws an event when a selection has been moved.

On Selection Changing method 621 throws an event when a selection is in the process of being changed.

On Selection Changed method 622 throws an event when a selection has been changed.

Set Default Drawing Attributes Override method 623 overrides the default drawing attributes associated with captured strokes.

In addition to the above methods, the ink canvas object 601 may or may not further include one or more ink recognition methods.

On Ink Recognition method 624 throws one or more events when ink has been recognized.

It is appreciated that the above methods are listed for illustrative purposes only. Other methods may be used in addition to or in place of the above methods with the ink canvas object.

FIG. 7 shows various events that may be associated with the ink canvas object 701:

Custom Edit Behavior Changed event 702 occurs when the custom edit behavior has changed.

Custom Edit Behavior Changing event 703 occurs when the custom edit behavior is about to change.

Editing Mode Changed event 704 occurs when the editing mode has changed.

Editing Mode Changing event 705 occurs when the editing mode is about to change.

Ink Canvas Adorner Entered event 706 occurs when an ink adorner has been entered.

Ink Canvas Adorner Exited event 707 occurs when an ink adorner has been exited.

Ink Erased event 708 occurs when ink has been erased.

Ink Erasing event 709 occurs when ink is about to be erased.

Editing Mode Inverted Changed event 710 occurs when an editing mode related to an inverted pen has changed.

Editing Mode Inverted Changing event 711 occurs when an editing mode relating to an inverted pen is about to change.

Stylus Is Inverted, Changing event 712 occurs when a user is inverting a stylus.

Stylus Is Inverted, Changed event 713 occurs when a user has inverted a stylus.

Selection Changed event 714 occurs when a selection has changed.

Selection Changing event 715 occurs when a selection is about to change.

Selection Moved event 716 occurs when a selection has moved.

Selection Moving event 717 occurs when a selection is about to be moved.

Selection Resized event 718 occurs when a selection has resized.

Selection Resizing event 719 occurs when a selection is about to be resized.

Selection Rotated event 720 occurs when a selection has rotated.

Selection Rotating event 721 occurs when a selection is about to be rotated.

Stroke Collected event 722 occurs when a stroke has been collected.

In addition to the above events, the ink canvas object 701 may or may not further include ink recognition events.

Ink Recognized event 723 occurs when ink has been recognized.

Detected Word event 724 occurs when a word has been detected.

Detected Image event 725 occurs when an inked image has been detected.

Detected Line event 726 occurs when an inked line has been detected.

Detected Paragraph event 727 occurs when an inked paragraph has been detected.

Detected Shape event 728 occurs when an inked shape has been detected.

Detected Annotation event 729 occurs when an ink annotation has been detected.

Converted Ink to Text event 730 occurs when ink has been converted to text.

It is appreciated that the above events are listed for illustrative purposes only. Other events may be used in addition to or in place of the above events with the ink canvas object.

Relationships

Figure 8:
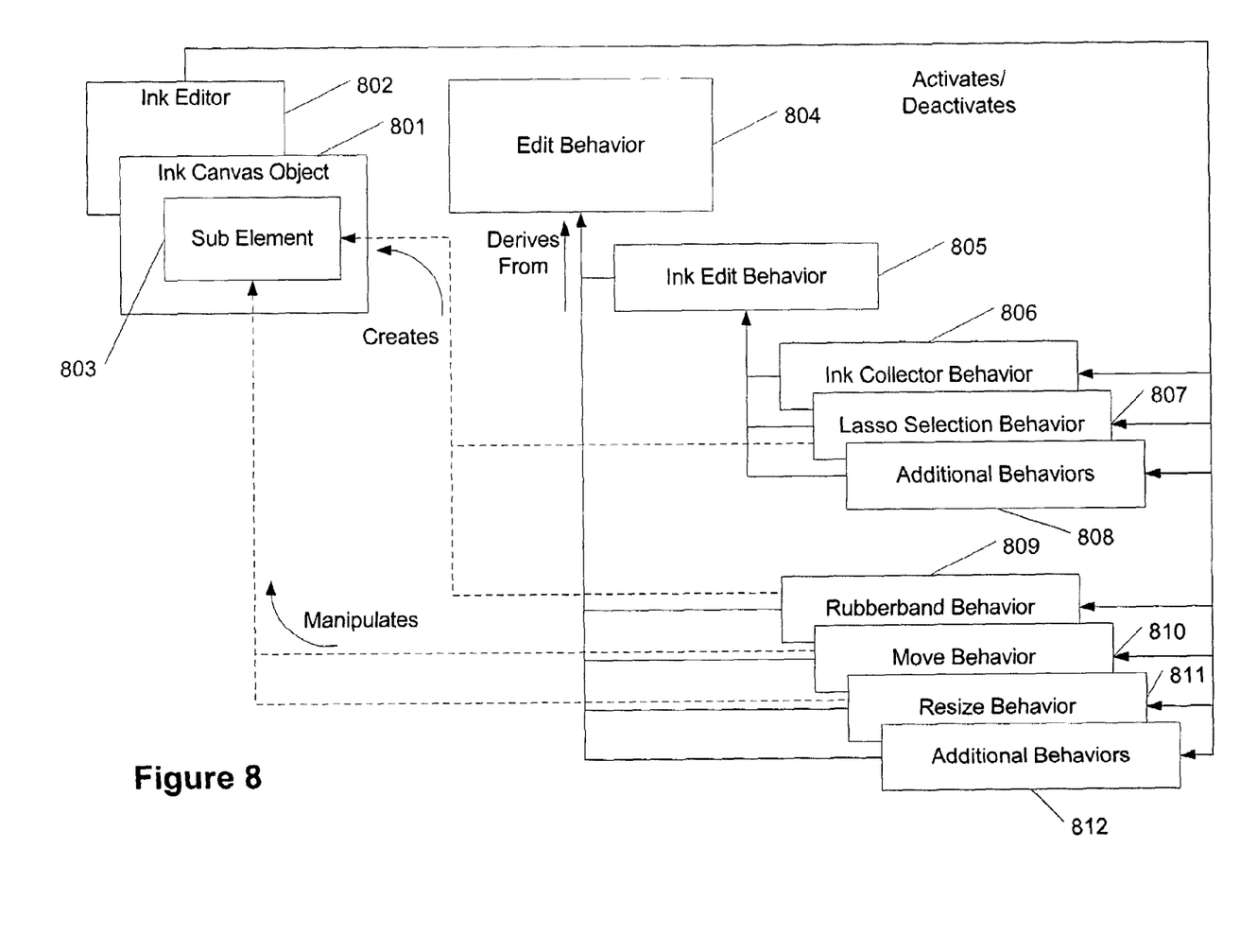
FIG. 8 shows relationships in accordance with objects and various behaviors in accordance with aspects of the present invention.

FIG. 8 shows various illustrative relationships between the ink canvas object, an ink editor, and various behaviors. Ink canvas object 801 includes one or more sub elements 803. Ink canvas object 801 is attached to the ink editor 802 and handles input events (change in focus, keyboard inputs, stylus inputs, and the like). The ink editor 802, among other things, orchestrates activation of componentized edit behavior 804 (including, but not limited to, ink behaviors and non-ink specific behaviors). The ink specific behaviors are collected in the ink edit behavior 805. The ink edit behavior 805 provides base activation/deactivation heuristics (deactivate on pen up, deactivate when the editing mode property changes on the ink canvas object, etc.). The ink edit behaviors 805 include ink collection behaviors 806, selection behaviors 807 (including lasso selection), and additional behaviors 808. The non-ink specific behaviors include rubberband behavior 809, move behavior 810, resize behavior 811, and additional behaviors 812.

The ink editor 802 manages the various behaviors 806-812 as shown by the arrows from the ink editor 802 to each of the behaviors 806-812. The various behaviors 806-812 may be grouped according to relative function. For instance, the creation or selection of a subset of content in sub element 803 may be performed by various selection behaviors including, but not limited to, the lasso selection behavior 807 and the rubberband selection behavior 809. The selected content in sub element 803 may be modified and/or manipulated by various behaviors as well by, for example, the move behavior 810 and resize behavior 811 (among others).

Referring back to the ink canvas object 801, it may be used with no children to have a region where the user can draw. Also, the ink canvas object 801 may be used on top of any other element or object or control, since the ink canvas object 801 may host any other type of element. This allows the developer to easily make anything annotatable or have any background for inking. It is appreciated that ink may be rendered at various levels (intermixed with elements, above, or below elements) in accordance with aspects of the invention.

An example of a code for accessing the ink canvas object may be as follows:

```
<InkCanvas>
    <TextPanel FontSize="12" FontFamily="Arial">
        Ink in XAML will be
        <TextPanel FontWeight="Bold">really</TextPanel>
        cool!
    </TextPanel>
</InkCanvas>
```

Since the InkCanvas can host any other type of element, the ability to ink does not need to be enabled for all other types of panels. The following is another example of a code snippet that allows association between the ink canvas and a flow panel (where the ink will be displayed):

```
<InkCanvas>
    <DockPanel Background="white">
        <FlowPanel Background="#669999" Width="100"
```

-continued

```
        Height="75"
            Dock="Right">
            <Text>Right</Text>
        </FlowPanel>
            <FlowPanel Background="#669966" Width="100"
            Height="75" Dock="Left">
            <Text>Left</Text>
        </FlowPanel>
    </DockPanel>
</InkCanvas>
class System.Windows.Controls.InkCanvas : Canvas {
```

The following shows the ink object being associated with the element itself. It is available as a dynamic property or as a .NET property for convenience:

```
public static readonly DynamicProperty InkProperty =
    PropertyManager.RegisterProperty("Ink", ...);
public System.Windows.Ink.Ink Ink;
```

The following is an example of XAML containing ink using the ink canvas object:

```
<InkCanvas
    Ink="base64:sdfsdfdsf..."
    Factoid="Default"
    TopRecognitionResult="To get her"
    <!-- hook up a gesture event handler -->
    Gesture="HandleGesture"
    Stroke="HandleStroke"
    <!-- set the default ink properties on the collection
    behavior
    -->
    DefaultDrawingAttributes.FitToCurve=true>
    <Image Left="200" Top="75" Source="image.png"
        Alt="alternate text"/>
    <def:Code>
        <![CDATA[
        void OnStroke (Element sender, ClickEventArgs e)
        {
            // Some Code
        }
        void OnGesture (Element sender, ClickEventArgs e)
        {
            // Some Code
        }
        ]]>
    </def:Code>
    "To get her"
</InkCanvas>
```

Various points of the ink canvas object may include one or more of the following:

Any element may be a child of the ink canvas in XAML. The children may be absolutely positioned.

Any dynamic event may have code attached by setting an XML attribute.

Any dynamic property may be initialized by setting an XML attribute.

The ink, which may or may not be a dynamic property, may be serialized as base64 ISF (a format for storing ink) in an XML attribute called "ink."

The body of the tag is the top recognition result string.

Clipping

Figure 9A:
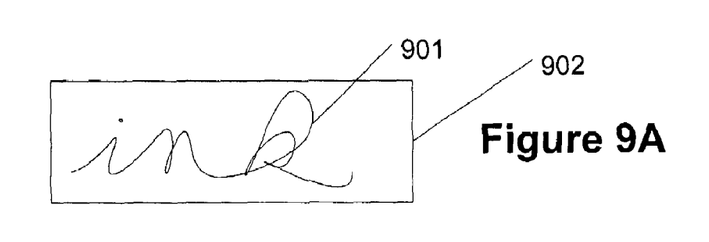
FIGS. 9A, 9B, and 9C show various degrees of ink clipped to a region in accordance with aspects of the present invention.
Figure 9B:
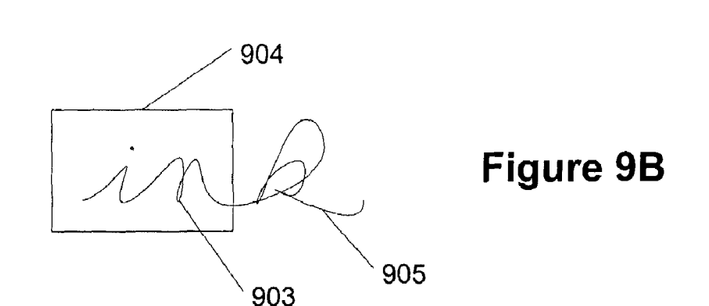
Figure 9C:
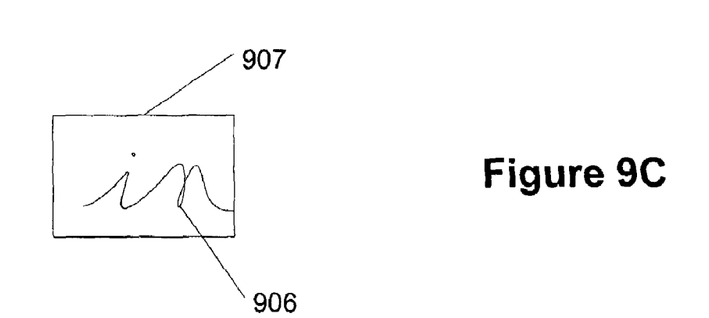

FIGS. 9A, 9B, and 9C show a visual attribute of the ink canvas object. Ink displayed on the ink canvas may or may not be clipped. In one example, the ink canvas object may be automatically resized to prevent the clipping of any content or only ink content. Alternatively, the ink canvas may be set to a size and have the content or only ink content clip. The clipping may be specified by a clip property or a combination of clip properties (for instance, a general content clip and a specific clip property for ink). In FIG. 9A, the entire content of ink 901 is shown in region 902. In FIG. 9B, the entire ink is shown. A first portion 903 of the ink is shown in region 904. The remainder 905 of the ink spills over the end of region 904. Here, ink clipping is off. In FIG. 9C, the ink 906 is clipped to the region 907. Here, clipping is on.

Aspects of the present invention have been described in terms of illustrative embodiments thereof. Numerous other embodiments, modifications and variations within the scope and spirit of the appended claims will occur to persons of ordinary skill in the art from a review of this disclosure.

We claim:

1. A tablet PC system comprising:
means for housing one or more objects in an object, said object comprising an ink canvas object providing ink functionality, the ink functionality comprising the editing, recognition and detection of ink, wherein the ink canvas object is configured to detect and respond to actions performed by a user using a stylus-based input device, wherein the ink comprises information captured from the use of the stylus-based input device;
means for rendering said one or more objects; and
means for rendering the ink on top of said one or more objects.

2. The system according to claim 1, further comprising:
means for modifying a property of said object.

3. The system according to claim 1, further comprising:
means for throwing an event by said object.

4. The system according to claim 1, further comprising:
means for performing a method associated with said object.

5. A process comprising the steps of:
housing one or more objects in an object, said object comprising an ink canvas object providing ink functionality, wherein the ink canvas object is configured to detect and respond to actions performed by a user using a stylus-based input device, whereby the ink comprises information captured from the use of the stylus-based input device;
one or more objects rendering themselves; and
rendering the ink on top of said one or more objects.

6. process according to claim 5, further comprising the step of:
modifying a property of said object.

7. The process according to claim 5, further comprising the step of:
throwing an event by said object.

8. The process according to claim 5, further comprising the step of:
performing a method associated with said object.

9. A computer-readable medium having a computer-executable program stored thereon, said program comprising the steps of:
housing one or more objects in an object, said object comprising an ink object providing ink functionality, the ink functionality comprising editing of ink, wherein the ink canvas object is configured to detect and respond to actions performed by a user using a stylus-based input device, whereby the ink comprises information captured from the use of the stylus-based input device;
one or more objects rendering themselves; and
rendering the ink on top of said one or more objects.

10. The computer-readable medium according to claim 9, said program further comprising the step of:
   modifying a property of said object.

11. The computer-readable medium according to claim 9, said program further comprising the step of:
   throwing an event by said object.

12. The computer-readable medium according to claim 9, said program further comprising the step of:
   performing a method associated with said object.

13. A system comprising:
   means for housing one or more objects in an object, said object comprising an ink canvas object providing ink functionality, the ink functionality comprising editing of ink, wherein the ink canvas object is configured to detect and respond to actions performed by a user using a user input device;
   means for one or more objects rendering themselves; and
   means for rendering the ink on top of said one or more objects.

14. The system according to claim 13, further comprising:
   means for modifying a property of said object.

15. The system according to claim 13, further comprising:
   means for throwing an event by said object.

16. The system according to claim 13, further comprising:
   means for performing a method associated with said object.

17. A process comprising the steps of:
   housing one or more objects in an object, said object comprising an ink canvas object providing ink functionality, the ink functionality comprising editing of ink, wherein the ink canvas object is configured to monitor and respond to actions performed by a user using a user input device;
   rendering the ink; and
   one or more objects rendering themselves so that they are intermixed with the rendering of said ink.

18. A computer-readable medium having a computer-executable program stored thereon, said program comprising the steps of:
   housing one or more objects in an object, said object comprising an ink canvas object providing ink functionality, the ink functionality comprising editing of ink, wherein the ink canvas object is configured to detect and respond to actions performed by a user using a user input device;
   rendering the ink; and
   one or more objects rendering themselves so that they are intermixed with the rendering of said ink.

19. A system comprising:
   means for housing one or more objects in an object, said object comprising an ink object providing ink functionality, wherein the ink object is configured to detect and respond to actions performed by a user using a user input device;
   means for rendering the ink; and
   means for one or more objects rendering themselves so that they are intermixed with the rendering of said ink.

20. A computer system comprising:
   an object for receiving ink, wherein said object is an ink canvas object that may be hosted in a tree-based organizational structure, wherein the said object provides ink functionality, the ink functionality comprising the editing, recognition and detection of ink, wherein the object is configured to monitor and respond to actions performed by a user using a stylus-based input device, wherein the ink comprises information captured from the use of the stylus-based input device.

* * * * *

UNITED STATES PATENT AND TRADEMARK OFFICE
CERTIFICATE OF CORRECTION

| | | |
|---|---|---|
| PATENT NO. | : 7,483,017 B2 | Page 1 of 1 |
| APPLICATION NO. | : 10/644896 | |
| DATED | : January 27, 2009 | |
| INVENTOR(S) | : Andrew Silverman et al. | |

It is certified that error appears in the above-identified patent and that said Letters Patent is hereby corrected as shown below:

In column 3, line 62, delete "system," and insert -- system 195, --, therefor.

In column 12, line 47, in Claim 6, before "process" insert -- The --.

Signed and Sealed this
Third Day of May, 2011

David J. Kappos
*Director of the United States Patent and Trademark Office*